March 31, 1931.　　　A. ROGERS　　　1,798,759
DEMOUNTABLE RIM FOR DISK AND OTHER WHEELS
Filed Oct. 3, 1923　　　2 Sheets-Sheet 1

Inventor:
Alfred Rogers
By his Attorneys Stockbridge & Borst

March 31, 1931. A. ROGERS 1,798,759
DEMOUNTABLE RIM FOR DISK AND OTHER WHEELS
Filed Oct. 3, 1923 2 Sheets-Sheet 2

Inventor:
Alfred Rogers
By his Attorneys

Patented Mar. 31, 1931

1,798,759

UNITED STATES PATENT OFFICE

ALFRED ROGERS, OF LONDON, ENGLAND, ASSIGNOR TO SHREWSBURY (S. T.) & CHALLINER TYRE COMPANY LIMITED, OF LONDON, ENGLAND, A LIMITED LIABILITY COMPANY OF GREAT BRITAIN

DEMOUNTABLE RIM FOR DISK AND OTHER WHEELS

Application filed October 3, 1923, Serial No. 666,252, and in Great Britain October 12, 1922.

This invention relates to disk wheels for road vehicles—although it may as will be hereinafter explained be applied equally well to spoke wheels for such vehicles—and has for object means for forming the tire rim of such wheels in such a manner that the said rims may be easily and rapidly detached from the wheel and replaced when desired.

In carrying the invention into effect I form the felly of a disk wheel in the form of an angle ring of T section, the disk of the wheel fitting into the angle of the angle ring and being connected thereto, the connecting means ensuring that whilst the rim may be rapidly detachable, the rim and disk when in position on the wheel will be sufficiently tightly held together to allow of the disk performing its usual functions as part of the wheel. The angle ring is formed solid with a tire rim for the reception of the wheel tire. For twin tires, the disk may be attached in any convenient manner to a binder or rim of T sections, and a channel section member be placed around this binder, a ring being then secured to each flange of the channel section member, each such ring being formed solid with or having secured thereto the tire rim proper.

Convenient methods of carrying the invention into effect will now be described with reference to the accompanying drawings, which are not to any special scale, and in which:—

Figure 1:
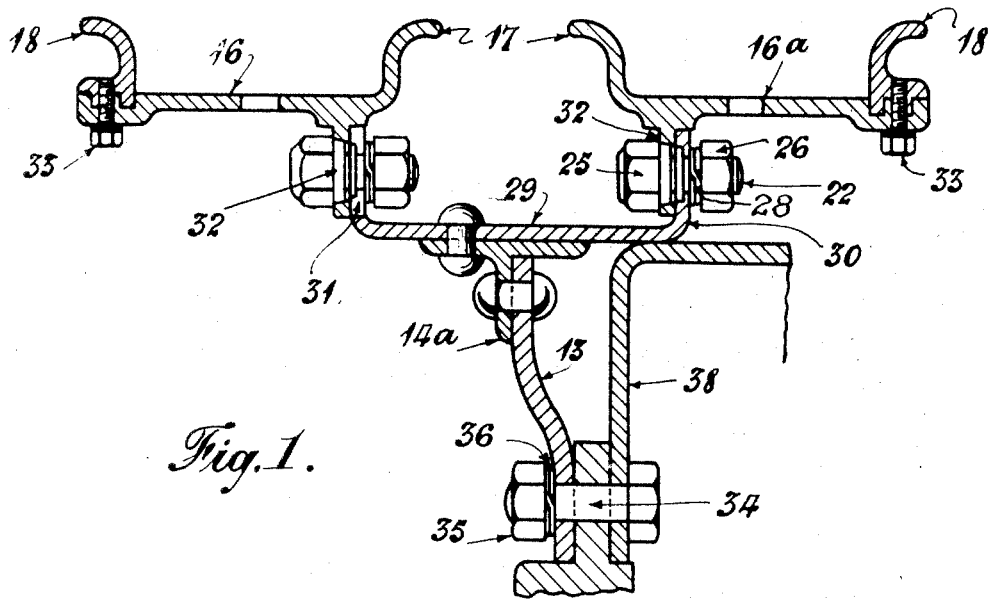
Figure 1 is a cross section illustrating the application of the invention to a dual rim wheel, with means for withdrawing the inner rim without removal of the wheel from the axle.
Figure 2:
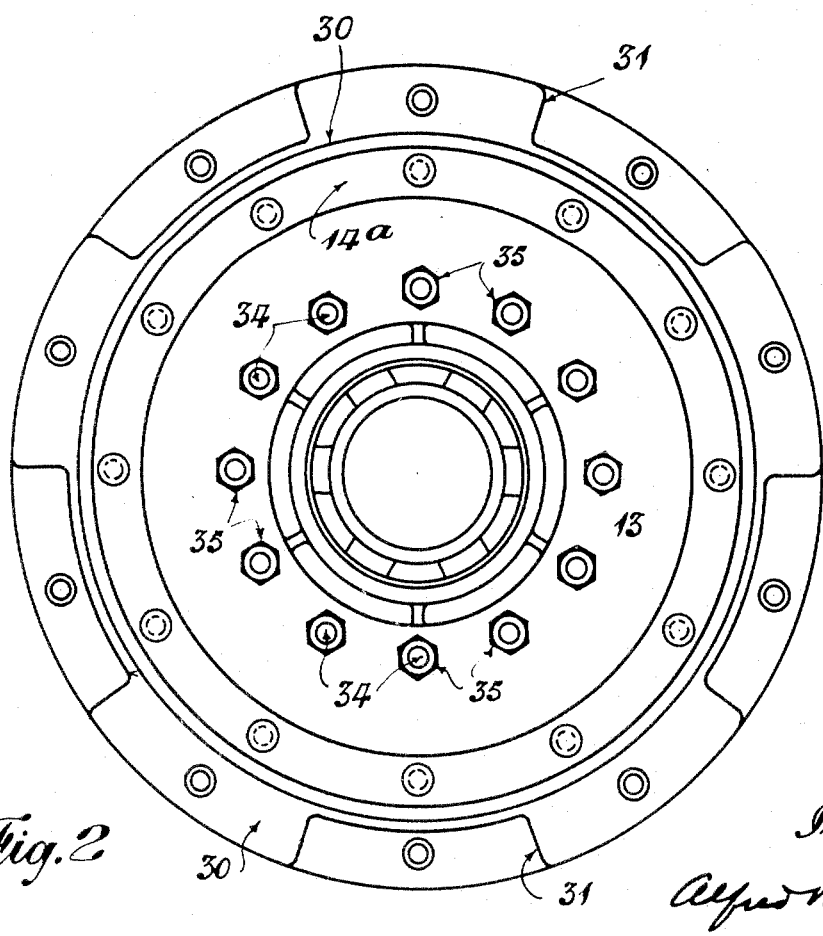
Figure 2 is an elevation of a wheel so fitted, the tire rims being removed.

In Figures 1 and 2 is illustrated a means for providing a dual rim wheel with the demountable rims according to this invention.

Figure 4:
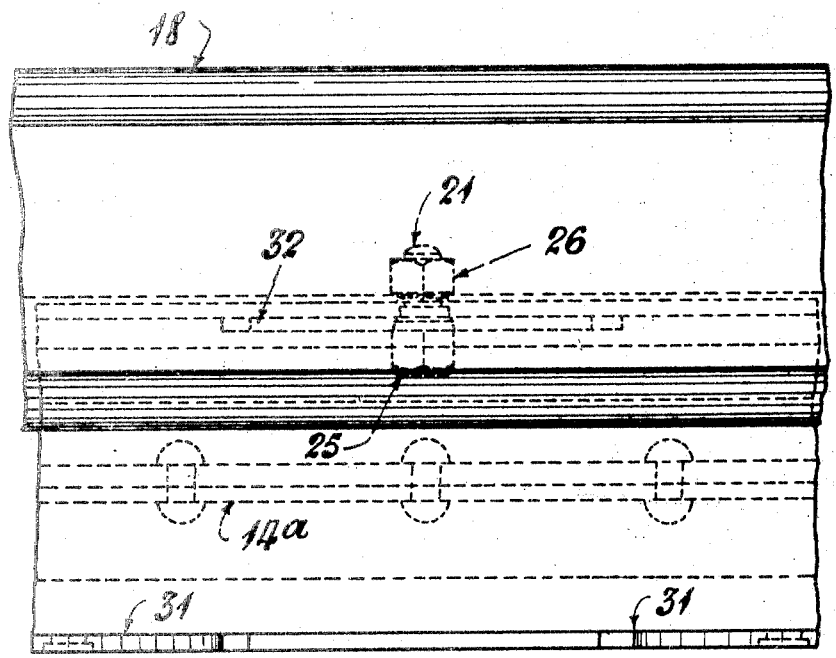

In those figures, 13 is the disk as before, and 14a an angle ring, which is permanently secured to the disk 13 by rivets as shown, or in any other manner. To the angle ring 14a is riveted a rim member 29 of U or channel section as shown in Figure 4, having the upstanding flanges 30 and 31. The elements designated by characters 16, 16a are tire rims which are preferably formed with the angle ring by the formation of a circular flange 32 thereon. Each tire rim 16, 16a in this case is thickened at the portion where the flange 32 joins the tire rim. With these modifications, the method of attachment is by bolt 22, cap nut 25, nut 26, and spring washer 28.

A method of securing the detachable flange 18 of the tire rim is shown in this figure, the said flange being threaded to screw upon the outer edge of the rim 16 or 16a and set screws 33 being provided fitting in threaded orifices in the rim and in the flange 18 to secure the latter in position. Flange 18 may be removed or replaced by means of a suitable tool fitting in tommy holes in the said flange. This construction is particularly suitable for heavy tires used in twin tire wheels. A suitable method of attachment of the disk to the hub in a twin tire wheel to which my invention is applied is shown in the figure, by means of hexagon headed bolt 34, nut 35 and spring washer 36, the bolt 34 passing through the hub flange 37 and through the brake drum, of which a portion is shown at 38.

Figure 3:
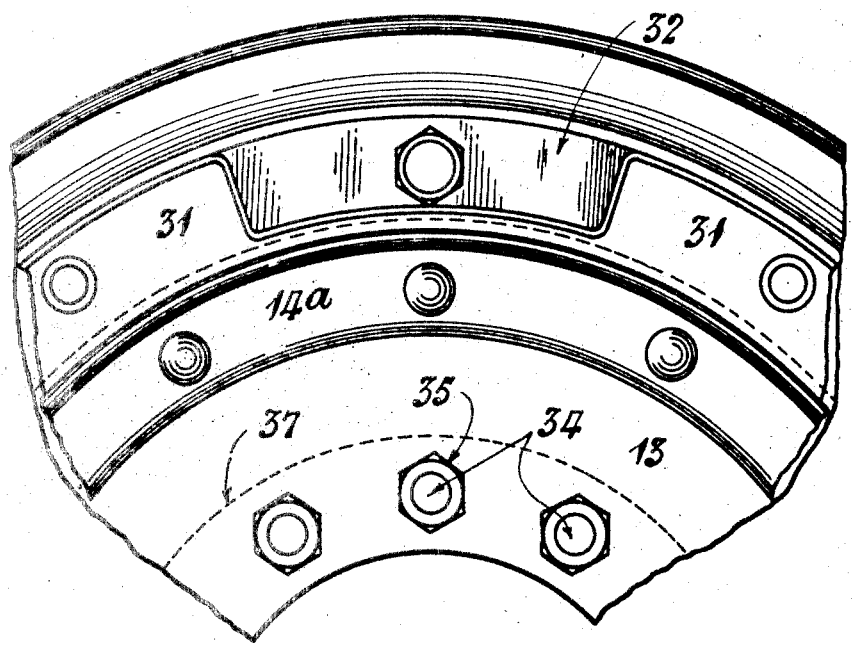
Figures 3 and 4 are respectively side elevation and plan to a larger scale of part of a felly for dual rims, to further illustrate the method of removing the inner rim through the outer without detaching the entire wheel from the axle.

In Figure 2 and to a larger scale in Figures 3 and 4, is illustrated a method of withdrawing the demountable rim 16a of Figure 1 through the flange 31 of that figure, when it is necessary to remove the said rim. The flange 31 is cut away at intervals and the circular flange 32, of the tire rim 16a is also cut away, the remaining portions of flange 32 being in staggered relation to the remaining portions of the flange 31. That is to say, when the tire rim 16a is in position any solid portion of the flange 32 will be opposite to a cut away portion or recess in the flange 31 of member 29. Rim 16 being removed, therefore, and the set screws 33 of the flange 18 and the cap nuts 25 of tire rim 16a being also removed, the rim 16a can be withdrawn from the outer side of the wheel, that is, towards the left of Figure 1, the solid portions of flange 32 passing through the cut away portions of the flange 31 of the channel member 29, and being replaceable in a similar manner, before replacing the tire rim 16.

It is obvious that various changes may be made in the embodiment illustrated in the drawings above particularly described within the principle and scope of my invention as expressed in the appended claims.

I claim:—

1. In a demountable wheel for vehicles, a felly having two opposed flanges, a tire rim supported by each flange, one of the flanges of the felly and tire rim secured to the other flange of the felly having recesses and radial projections in staggered relation whereby the tire rim may be drawn through the said flange on the felly in a direction parallel to the wheel hub axis and means for detachably securing each tire rim to its flange.

2. In a demountable wheel for vehicles, a felly having two opposed flanges, a tire rim having a depending flange secured to each of the flanges of the felly, one of the flanges of the felly, and the flange on the tire rim secured to the other flange of the felly having recesses therein forming radial projections thereon, the recesses in the flanges being of sufficient width and depth to permit the projections on the flanges to pass therethrough, whereby the tire rim may be drawn through the flange on the felly in a direction parallel to the wheel hub axis.

In testimony whereof I have hereunto set my hand.

ALFRED ROGERS.